March 2, 1954
ICHIRO MURATA
2,670,547
INSTRUMENT FOR MEASURING DIP AND
ORIENTATION OF DEEP WELLS
Filed Aug. 13, 1951
Fig.2 Fig.1 Fig.3
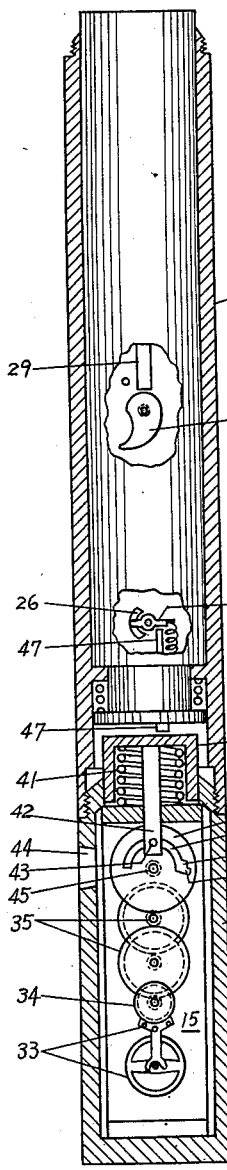
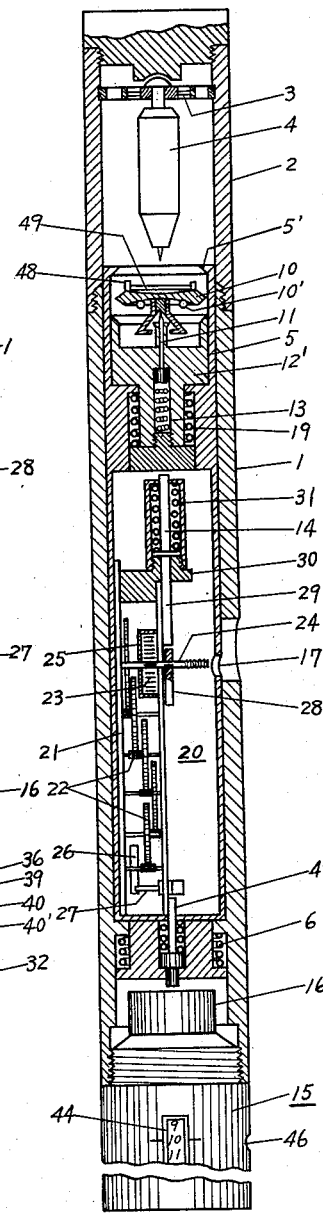
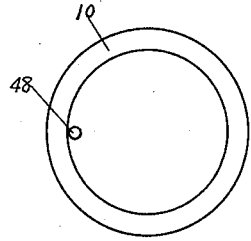
Fig.4
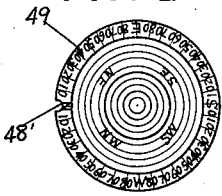
Fig.5
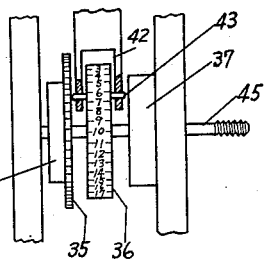
Inventor:
Ichiro Murata,
By: Pierce, Scheffler & Parker,
Attorneys.

Patented Mar. 2, 1954

2,670,547

UNITED STATES PATENT OFFICE 2,670,547

INSTRUMENT FOR MEASURING DIP AND ORIENTATION OF DEEP WELLS

Ichiro Murata, Tokyo, Japan

Application August 13, 1951, Serial No. 241,634

2 Claims. (Cl. 33—205.5)

This invention relates to an instrument for measuring dip and orientation of a deep well boring, and more particularly to a mechanical indicating or recording device which records the inclination and direction at a required depth of a deep well boring.

The principal object of this invention is to provide an instrument which gives a direct indication of the dip and orientation without necessitating any other additional equipment.

Another object of the invention is to provide an instrument which facilitates the taking of a record of the dip and orientation on a graduated plate or chart.

A further object of the invention is to provide means for preventing errors and false indications resulting from shock and vibration due to collision of the hanging weight.

In heretofore known well indicators using a hanging weight and a scale disc provided with a permanent magnet, a complicated automatic camera is provided in the casing for taking a photograph of the indication on the scale disc, that is, the relative position of the needle point and the graduation on the scale when the instrument became stationary after it had been lowered in a well tube, and the film taken out of the instrument after it has been pulled up is developed in order to obtain a picture showing the indication. In such a device, the film is not only deteriorated by the heat and other causes existing at a depth of 3000 to 4000 meters in the deep well but also it requires considerable time and labour to develop a film so that it was impossible to obtain a desirable quick and direct indication.

The above disadvantages can be entirely obviated by the present invention, in which no use is made of such means as an automatic camera, the indication being obtained by purely mechanical means, thereby slowly fixing a freely supported permanent magnet to a scale disc with a definite relation so as to facilitate the reading on the scale disc through transparent plates.

Another important feature of this invention is that the trace of the needle point of the hanging weight can be impressed directly on a graduated paper or chart put on the magnet disc without disturbing its finally set condition, thereby facilitating the taking of a record of each measurement.

With the above objects in view the invention consists of novel details of construction and combination of parts hereinafter fully described and claimed.

Referring to the drawing:

Fig. 1 is a sectional elevation of a recording type instrument embodying this invention;

Fig. 2 is a sectional side elevation of the lower part of the instrument shown in Fig. 1;

Fig. 3 is a plan view of the magnet disc;

Fig. 4 is a plan view of a scale plate or chart and

Fig. 5 is a partial side view of the cam wheel of the watch mechanism in an enlarged scale.

Now referring to Fig. 1, 1 designates an outer cylinder having a top cover 2 detachably screwed thereto. 4 represents a hanging weight freely supported by a gimbal 3 in the top cover 2 so as to take always its vertical position independent of the inclined position of the outer cylinder 1. 5 represents an inner casing movably fitted into the outer cylinder 1 and normally biased to the lower position by means of a spring 6. The casing 5 has an open top leaving a small inside flange 5' to support a disc 10 provided with a small pin 48 projecting therefrom for engaging the recess 48' of a scale plate or compass chart 49 printed with the angle of inclination on concentric circles and the direction angle around the circumference. The disc 10 may be made of plastic material or metal such as Duralumin having a permanent magnet 10' fixed thereto and is freely supported on a needle axle 11 to take always a definite N-S direction. Axle 11 is slidably fitted to the bearing sleeve 12' and urged upwardly by a spring 13, and the bearing sleeve 12' is slidably fitted in the inner tube 5 and biased downward by a spring 19.

An automatic time lifting device 15 of suitable construction is provided and includes a lifting top 16. As shown in Fig. 2, the device 15 below the lifting top 16 comprises a watch mechanism enclosed in a casing 32, and having an anchor mechanism 33, a sprocket wheel 34, a series of gear wheels 35, a cam wheel 36, a spring casing 37 (Fig. 5) and a stop mechanism 38. The cam wheel 36 has a circular groove 39 and two radial grooves 40 and 40'. The movable top 16, normally biased upward by a spring 41 engages the cam wheel 36 by means of a leg 42 and a pin 43 which passes through the groove 39. Around the circumference of the cam wheel 36 is provided numerical indicia which can be seen through a window opening 44, and the operating time of the watch mechanism may be regulated as desired by turning the spring axle 45 with a key inserted through a hole 46 provided in the casing. During the operation of the watch mechanism, if the pin 43 engages the circular part of the groove 39, the top 16 is held stationary. But when the radial groove 40, and successively groove 40', arrive at the position of the pin 43 after a predetermined time limit, the top 16 is pushed out rapidly by spring 41 once and after some time interval.

20 designates a time limit slow motion mechanism arranged on a frame 21 fixed to the inside of the inner casing 5 above the time controlled lifting device 15. Mechanism 20 comprises a series of gearings 22, a spiral spring 23 which is fixed at one end to the axle 24 and at the other end to the casing 25, and brake blades 26 which are normally held stationary by a stop lever 27. A cam 28 keyed to the axle 24 and arranged to act on the spindle 29 which is supported by a bracket 30 fixed to the frame 21 or inner casing 5, and the top part 14 of the spindle 29 is biased to the lower position by a spring 31. A hole 17 in the outer and inner casings 1 and 5 provides access to the end of axle 24 for affixing a key to the latter to wind the spring 23.

The operation of the instrument shown in Figs. 1 and 2 is now described as follows:

The watch mechanism of the time controlled device 15 is adjusted to act after a definite time interval which is necessary for the present instrument to arrive at a pre-determined depth of a deep well and some allowance added thereto, and then the instrument is placed in a protective shell and lowered into a deep well of which the dip and orientation are to be measured. Arriving at the predetermined depth, the outer cylinder 1 stops and takes the angle of repose conforming with the inclination of the well. After the definite time limit as set on the watch mechanism of device 15, the radial groove 40 of the cam wheel 36 of the watch mechanism arrives at the position of pin 43, then the top 16 is projected upwards and acts on the rod 47 to release lever 27 and thus start the time mechanism 20. As the time mechanism runs, the cam 28, acting on the rod 29, lifts up rod 29 and the upper part 14 of rod 29 in turn raises bearing sleeve 12' slowly until the magnet disc 10 engages the top edge 5' of the inner casing 5 and is clamped in such position by the top edge of the sleeve 12' so that the magnet disc 10 may be positively clamped. The top 16 of the watch mechanism again raises quickly to a higher position when the pin 43 engages the second radial groove 40', and forces up the inner casing 5 as a whole so that the scale plate 49 on the magnet disc 10 collides with the hanging weight 4 and the needle point impresses a trace on the scale plate. Accordingly an exact and positive measurement can be recorded on the scale plate 49 without errors due to inspecting the scale through transparent plates as in some known type, and also without disturbance by shock of collision caused by the hanging weight. It is very convenient in handling and the operation can easily be repeated by replacing the used scale plate 49, so that the working efficiency may be promoted.

Having thus described my invention what I claim as new and desire to secure by Letters Patent of the United States is:

1. An instrument for measuring dip and orientation of a deep well comprising an outer cylinder, a weight having a needle point, gimbal means hanging said weight from the top of said outer cylinder, an open topped inner casing slidably fitted in said outer cylinder, spring means acting between said cylinder and inner casing biasing said inner casing to a lower position, said inner casing having an engaging inner edge at the open top thereof, a bearing sleeve having an upwardly projecting top supporting edge slidably fitted in said inner casing, second spring means acting between said inner casing and bearing sleeve biasing said bearing sleeve to a lower position in said inner casing, a magnet disc adapted to receive a graduated scale plate, said disc having a peripheral edge adapted to be clamped between the inner edge at the top of said inner casing and the top edge of said bearing sleeve, a vertical needle axle resiliently fitted to said bearing sleeve and which freely supports said magnet disc, an automatic time limit slow lifting device secured to the inside of said inner casing arranged when operated to raise said bearing sleeve against the biasing action of said second spring means thereby raising and clamping said magnet disc at the raised position between the inner edge at the top of said inner casing and the top edge of said bearing sleeve, an automatic time limit two stage operating device arranged to start said time limit slow lifting device at the first stage and to raise said inner casing as a whole at the second stage thereby to cause said scale plate to be struck by the needle point of said hanging weight.

2. An instrument for measuring dip and orientation of a deep well as defined in claim 1 wherein said automatic time limit slow lifting device comprises a speed reduction gearing train, a spiral spring connected with said gearing train for driving the same, a cam rotated by said gearing train and which is coupled to said bearing sleeve for raising the same, a stop lever engageable with said gearing train for holding said gearing train stationary and a starting lever engageable with said stop lever for disengaging the latter from said gearing train; and said automatic time limit two stage operating device comprises a top, spring means biasing said top in an upward direction, a watch gear train mechanism of which the last gear is provided with a circular groove connecting with two stage radial grooves, and a pin secured to a leg of the top of said two stage operating device engaging in said circular groove for holding said top in a lowered position against the biasing action of the said spring means therefor, said last gear being rotated in accordance with time to transfer said pin from said circular groove to said radial grooves in sequence thereby releasing said leg and top for movement in an upward direction in two stages, said top in its first stage of movement engaging the said starting lever of said automatic time limit slow lifting device to thereby effect a lifting of said magnet disc slowly and a clamping of the same in a stable condition, and the second stage of movement of said top bringing the latter into engagement with said inner casing as a whole to cause said inner casing to lift and cause a trace of the needle point of said hanging weight to be impressed upon the scale plate on said magnet disc.

ICHIRO MURATA.

References Cited in the file of this patent

UNITED STATES PATENTS

| Number | Name | Date |
|---|---|---|
| 2,057,787 | Monroe | Oct. 20, 1936 |
| 2,089,153 | Monroe | Aug. 3, 1937 |